United States Patent [19]
Tan

[11] Patent Number: 5,029,965
[45] Date of Patent: Jul. 9, 1991

[54] METHOD FOR ALIGNING AN OPTICAL FIBER TO AN ACTIVE DEVICE

[76] Inventor: Yoke T. Tan, Toa Payoh, Lorong 1, #03-584, Singapore 1231 Blk 165, Singapore

[21] Appl. No.: 440,000

[22] Filed: Nov. 21, 1989

[51] Int. Cl.$^5$ .............................................. G02B 6/42
[52] U.S. Cl. ................................. 350/96.20; 350/320
[58] Field of Search .................... 364/194; 350/96.15, 350/96.20, 320; 357/17, 19, 30; 250/227.29

[56] References Cited

U.S. PATENT DOCUMENTS

| | | | |
|---|---|---|---|
| 4,787,698 | 11/1988 | Lyons et al. | 350/96.20 |
| 4,802,726 | 2/1989 | Palmquist et al. | 350/96.20 |
| 4,854,667 | 8/1989 | Ebata et al. | 350/96.20 |
| 4,887,882 | 12/1989 | Mousseaux et al. | 350/96.20 |

OTHER PUBLICATIONS

Box, Hunter & Hunter, Statistics for Experimenters, Chapters 14 & 15.

Primary Examiner—Frank Gonzalez

[57] ABSTRACT

A method for locating an optimum alignment of an optical fiber to an active device uses response surface approximations. In an X-Y coordinate plane perpendicular to the optical fiber, measurements at a first series of alignments are made from which the path of steepest ascent of light transfer between the optical fiber and the active device is approximated by first order design model. Further measurements are made within a more limited region determined by the first order design model approximation. From the further measurements second order modelling is done to approximate the alignment resulting in maximum light transfer between the optical fiber and the active device.

9 Claims, 9 Drawing Sheets

METHOD FOR ALIGNING AN OPTICAL FIBER TO AN ACTIVE DEVICE

BACKGROUND

The present invention concerns the alignment of an optical fiber to a light source or to a light detector before permanent attachment.

When attaching an optical fiber to a light source, for example a laser diode or a light emitting diode (LED), or to a light detector, for example a PIN detector, alignment is critical. Alignment is a complicated process due to the fact that the narrow diameter of an optical fiber and the limited size of a chip which serves as a light source or light detector. For example, the diameter of an optical fiber is typically 62.5 micrometers. A PIN detector typically has an active area with a diameter of approximately 60 micrometers. An LED typically has a light emission area with a diameter of 20 micrometers. Therefore, accuracy of alignment within a micrometer is essential. A misalignment by even a couple of micrometers can cause a variation in optical power budget loss of a few dBm.

Until recently, alignment was generally performed manually. Highly experienced operators would use manual positioning stages, optical power meters and large doses of patience to align an optical fiber for attachment to a light source or a light detector. More recently automated systems have been used for such alignment. A typical automated alignment system usually includes mechanical, electrical and electro-optical components and instrumentations controlled by a computer system.

In a typical automated alignment system either a light source (e.g. LED) or a light detector (e.g. PIN detector) is assembled on a circular header. The resultant assembly is then tested. After testing, the assembly is aligned to the fiber optical connector receptacle. Once aligned, the fiber optical connector receptacle is permanently attached and sealed to the assembly in the aligned position to form an optical subassembly (OSA).

Typically, alignment of the assembly of the fiber optical receptacle is done as follows. A fiber ferrule is plugged into the connector receptacle to monitor resultant light power from a light source or to measure resultant current from a light detector. A header portion of the optical fiber is then moved in an X-Y plane parallel to the plane in which the emission area or the detection area resides. The header portion is left at the X-Y coordinates which result in the maximum output power. The port cap or connector receptacle is then moved along a Z-axis perpendicular to the plane in which the emission area or detection area resides. This is done to focus the light beam in order to find the location along the Z-axis where maximum output power is reached. Then the header is again varied in the X-Y plane to find the position of maximum power. At this point, the OSA is ready for permanent attachment.

SUMMARY OF THE INVENTION

In accordance with the preferred embodiment of the present invention a method for locating an optimum alignment of an optical fiber to an active device is presented. The optical fiber is aligned to the active device at a first series of X-Y coordinates. At each of the series of X-Y coordinates first measurements are taken which indicate the relative amount of light transferred between the optical fiber and the active device.

From the first measurements a first order design model is made which approximates the path of steepest ascent of the amount of transferred light relative to selected X-Y coordinates. Second measurements are taken for a second series of X-Y coordinates which are along the approximated path of steepest ascent.

Third measurements are taken of the amount of transferred light when the optical fiber is aligned with the active device at a third series of X-Y coordinates. The third series of X-Y coordinates are in a region which includes the X-Y coordinate in the second series of X-Y coordinates at which the maximum amount of transferred light was measured.

A second order composite design model approximation is made of the approximate optimal alignment X-Y coordinate at which the maximum amount of light is transferred. The second order composite design model approximation is based on the third measurements.

Fourth measurements are taken of the amount of transferred light when the optical fiber is aligned with the active device at a fourth series of X-Y coordinates near the approximate optimal alignment X-Y coordinate. The optimum alignment of the optical fiber to the active device an X-Y coordinate is selected from the fourth series of X-Y coordinates at which the maximum amount of transferred light was measured.

The method of the present invention allows for alignment of an optical fiber to an active device with significantly fewer measurements than, for example, the prior art one-variable-at-a-time method. Since significantly fewer measurements are made, the alignment can be performed significantly faster.

The same basic method may be used to align the optical fiber to the active device using three coordinate axes instead of two.

DESCRIPTION OF THE PREFERRED EMBODIMENT

Figure 1:
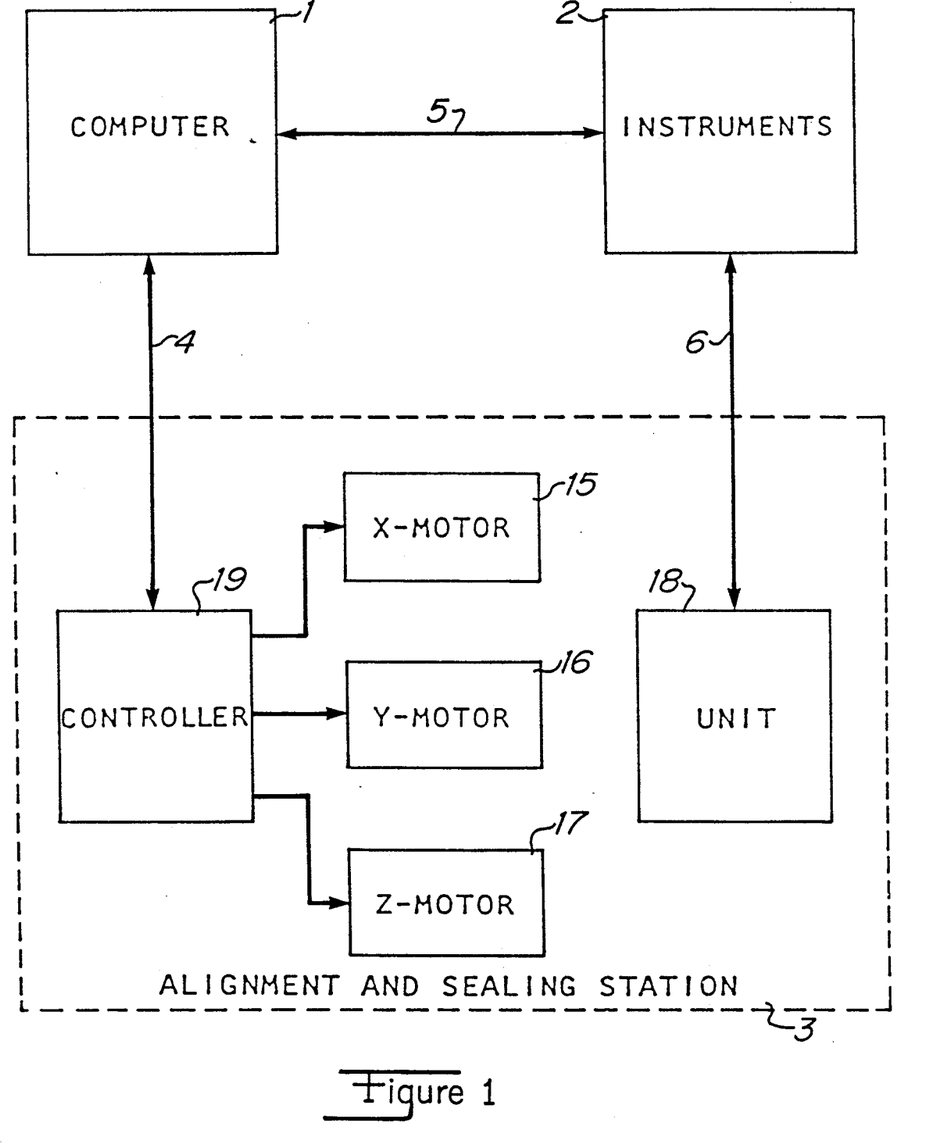
FIG. 1 shows a block diagram of an automated aligner according to the preferred embodiment of the present invention.

In FIG. 1 a block diagram of automate aligner is shown. An alignment and sealing station 3 is used to perform actual mechanical alignment of an optical fiber connector to a chip. The alignment is changed by means of motors which are able to independently change the alignment along the X-axis, Y-axis and Z-axis. A motor 15 changes the alignment along the X-axis, a motor 16 changes the alignment along the Y-axis, and a motor 17 changes the alignment along the Z-axis. Alignment and sealing station 3 also, upon completion of alignment, performs the permanent affixing and sealing of the optical fiber connector to the chip. The result is a finished optical subassembly (OSA).

An instrumentation module 2, through a data path 6, provides power and control signals to a unit 18 which is aligned within alignment and sealing station 3. Instrumentation module 2 also receives from unit 18 through data path 6 electrical and/or optical feedback.

A computer 1 communicates with instrumentation module 2, through a data path 5. In the preferred embodiment, computer 1 is a HP model 9000 series 300 computer and data path 5 is implemented using HPIB (or IEEE 488) bus protocol. Computer 1 makes calculations based on feedback from instrumentation module 2 in order to determine X, Y, and Z coordinate positions to be set by alignment and sealing station 3. Computer 1 communicates with a controller 19 within alignment and sealing station 3 by way of a data path 4. In the preferred embodiment, data path 5 is implemented using HPIB bus protocol, and controller 19 is a controller model 4000 available from Kensington Laboratories Inc., a U.S. corporation having a place of business at 750 National Court, Richmond, Calif. 94804. Based on signals from computer 1, controller 19 sends control signals to motor 15, motor 16 and motor 17 to direct change of alignment along the X-axis, Y-axis and Z-axis.

Figure 2:
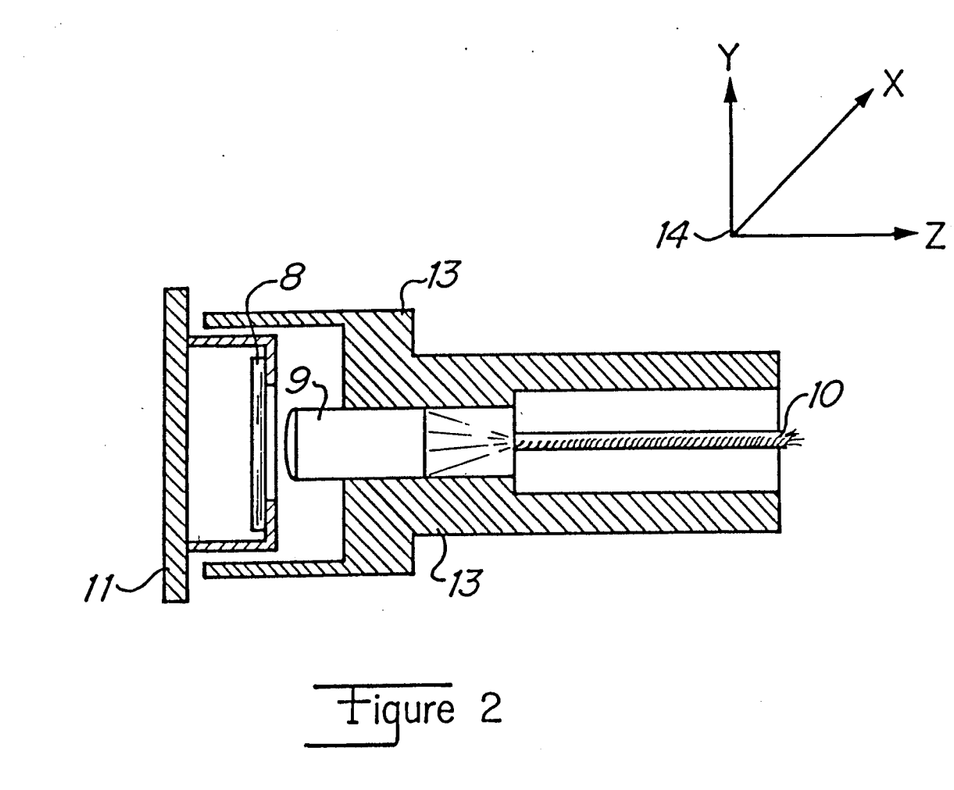
FIG. 2 shows an optical subassembly (OSA) in accordance to the preferred embodiment of the present invention.

An optical subassembly is shown in FIG. 2. An optical fiber 10 in a housing of ceramic ferrule is held to a chip 11 by means of a port cap connector 13. A lens 9 focuses light to or from optical fiber 10. A chip, i.e., a light emitting diode (LED) or a PIN diode is placed on a circular header 11. A window 8 separates the chip from lens 9. A coordinate axis 14 shows the direction of an X-coordinate, a Y-coordinate and a Z-coordinate. The X-Y plane lies perpendicular to optical fiber 10. Alignment is performed by moving circular header 11 in the X- direction and the Y direction and by moving port cap connector 13 in the Z -direction. The movement is done using the motor 15, 16 and 17.

Figure 3:
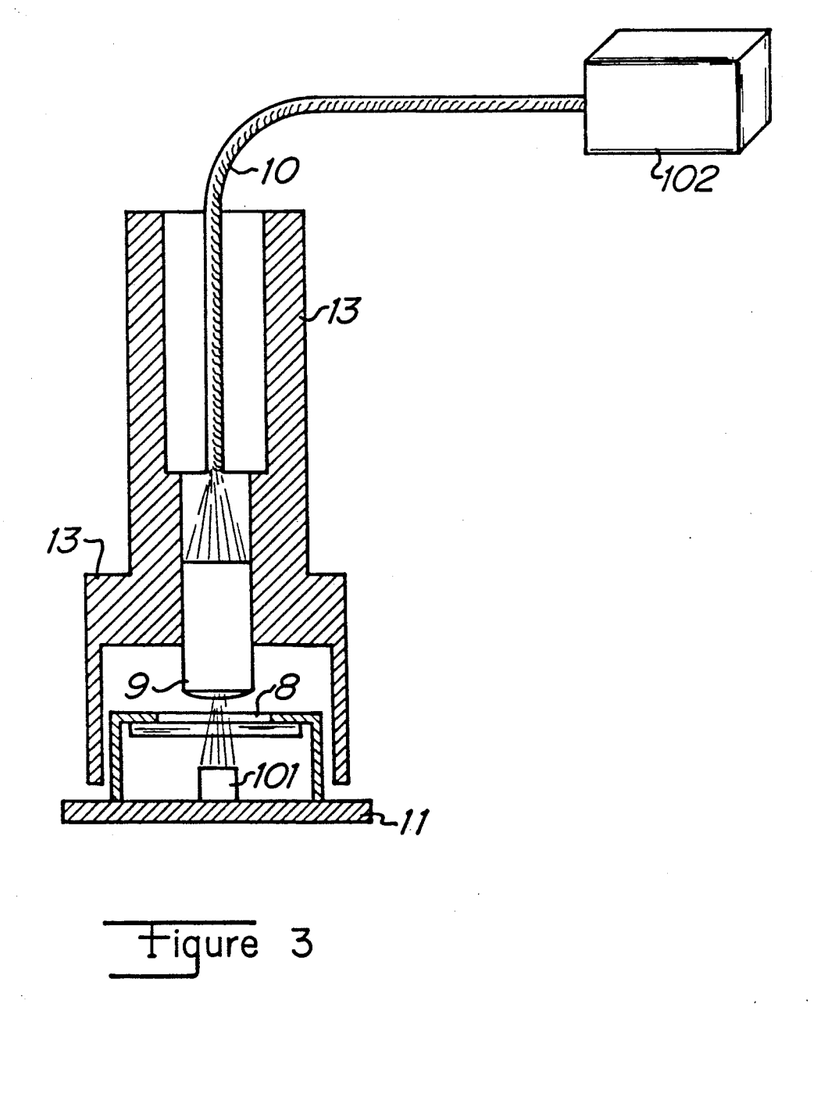
FIG. 3 shows the OSA in FIG. 2 used in conjunction with a pin diode.

FIG. 3 shows a PIN detector 101 placed on circular header 11. Light from a light source 102 is transmitted through optical fiber 10, through lens 9 through window 8 to PIN detector 101. PIN detector 101 will generate current based on the amount of light which reaches the active area. As the alignment is adjusted PIN detector 101 sends feedback to instruments 2. This feedback is used by computer 1 to aid in alignment as discussed further below.

Figure 4:
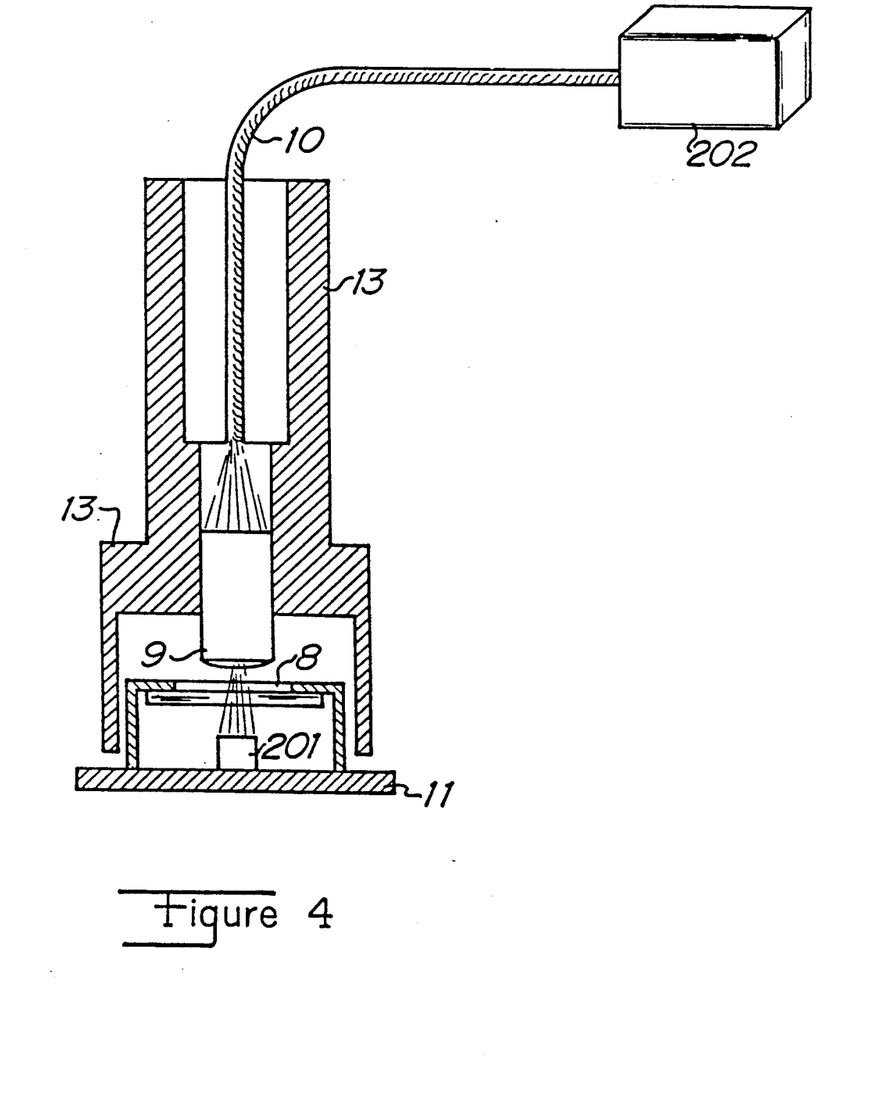
FIG. 4 shows the OSA in FIG. 2 used in conjunction with a light emitting diode (LED).

FIG. 4 shows an LED 201 placed on circular header 11. Light from LED 201 is transmitted through window 8, through lens 9, through optical fiber 10 to a detector 202. Detector 202 will generate current based on the amount of light which reaches the active area. As the alignment of the position of LED relative to lens 9 is adjusted, detector 202 sends feedback to instruments 2. This feedback is used by computer 1 to aid in alignment.

The method of alignment according to the present invention uses a response surface methodology as an alignment algorithm to align optical fiber 10 in the X-Y coordinate plane over a known contour response. The method according to the present invention is contrasted to a one-variable-at-a-time strategy for determining the optimum alignment of the optical fiber in the X-Y coordinate plane.

In the one-variable-at-a-time strategy, as applied to a light detector such as a PIN detector, light is propagated through optical fiber 10 through window 8 to active area 12. The current generated by light impacting active area 12 (referred to as the "response") is monitored. The alignment of chip 11 to optical fiber 10 is arbitrarily varied along one coordinate axis, while the alignment of chip 11 to optical fiber 10 is held constant along the other coordinate axes. A step-by-step methodology for a one-variable-at-a -time strategy is set out below:

Step 1: The initial X, Y and Z coordinates at the beginning of the alignment are defined as being at the coordinate position of (0,0,0). A search window of 200 micrometers in diameter is defined in the X-Y coordinate plane with its center at the coordinate position of (0,0,0). The optimum alignment in the X-Y coordinate plane is assumed to be within this window.

Step 2: Without varying alignment along the Y-coordinate axis or the Z-coordinate axis the alignment along the X axis is varied at increments of 5 micrometers starting from the coordinate point (−100,0,0) and continuing to the coordinate point (100,0,0), where the coordinate points are given in micrometers. The response at each increment is measured by evaluating the power output generated by the PIN detector. A curve 21, shown in FIG. 3, of the response is plotted onto a screen 20 of computer 1 and stored in a data array within a memory of computer 1.

Step 3: From the data array, computer 1 calculates a point 22 where response is 90% of the maximum response from the left side of curve 21 and a point 23 where response is 90% of the maximum response from the right side of curve 21. A midpoint 24 between the 90% response points is chosen as the peak X-coordinate point. Computer 1 will instruct alignment and sealing station 3 to go to this coordinate point. The coordinate point may be labelled (X-peak,0,0).

Step 4: Without varying alignment along the X-coordinate axis or the Z-coordinate axis, the alignment along the Y axis is varied at increments of 5 micrometers starting from the coordinate point (X-peak,−100,0) and continuing to the coordinate point (X-Peak,100,0). The response at each increment is measured by evaluation the power output generated by the PIN detector. A curve 31, shown in FIG. 4, of the response is plotted onto screen 20 of computer 1 and stored in a data array within the memory of computer 1.

Step 5: From the data array, computer 1 calculates a point 32 where response is 90% of the maximum response from the left side of curve 31 and a point 33 where response is 90% of the maximum response from the right side of curve 31. A midpoint 34 between the 90% response points is chosen as the peak Y-coordinate point. Computer 1 will instruct alignment and sealing station 3 to go to this coordinate point. The coordinate point may be labelled (X-peak,Y-peak,0).

Step 6: Vary the alignment along the Z axis until the light beam from optical fiber 10 is at peak response power. The coordinate point for this position is (X-peak,Y-peak,Z-optimum). For step 7 through step 10 below coordinate point (X-peak,Y-peak,Z-optimum) is re-labelled (0,0,Z-optimum).

Step 7: Without varying alignment along the Y-coordinate axis or the Z-coordinate axis, the alignment along the X axis is varied at increments of 5 micrometers starting from the coordinate point (−100,0,Z-optimum) and continuing to the coordinate point (100,0,Z-optimum). A curve 41, shown in FIG. 5, of the response is plotted onto screen 20 of computer 1 and stored in a data array within the memory of computer 1.

Figure 5:
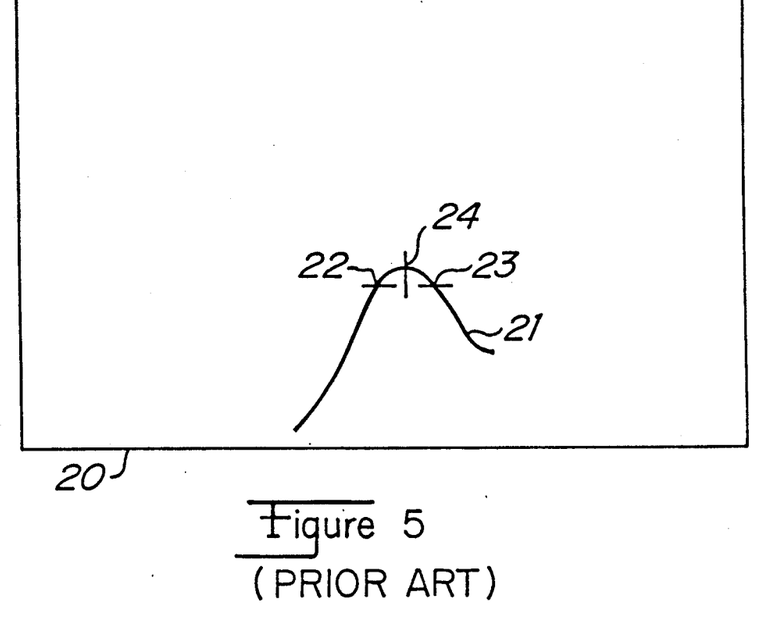
FIG. 5 through FIG. 8 show screen displays resulting from a prior art method for aligning an optical subassembly.

Step 8: From the data array, computer 1 calculates a point 42 where response is 90% of the maximum response from the left side of curve 41 and a point 43 where response is 90% of the maximum response from the right side of curve 41. A midpoint 44 between the 90% response points is chosen as the optimum X-coordinate point. Computer 1 will instruct alignment and sealing station 3 to go to this coordinate point. The coordinate point may be labelled (X-optimum,0,Z-optimum).

Step 9: Without varying alignment along the X-coordinate axis or the Z-coordinate axis the alignment along the Y axis is then varied at increments of 5 micrometers starting from the coordinate point (X-optimum,−100,Z-optimum) and continuing to the coordinate point (X-optimum,100,Z-optimum). The response at each increment is measured by evaluation the power output generated by the PIN detector. A curve 51, shown in FIG. 6, of the response is plotted onto screen 20 of computer 1 and stored in a data array within the memory of computer 1.

Figure 6:
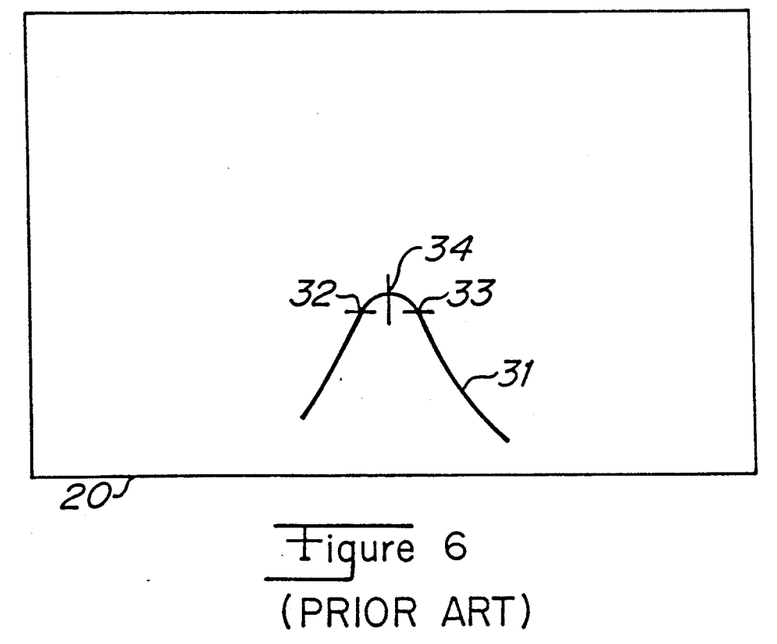
Figure 7:
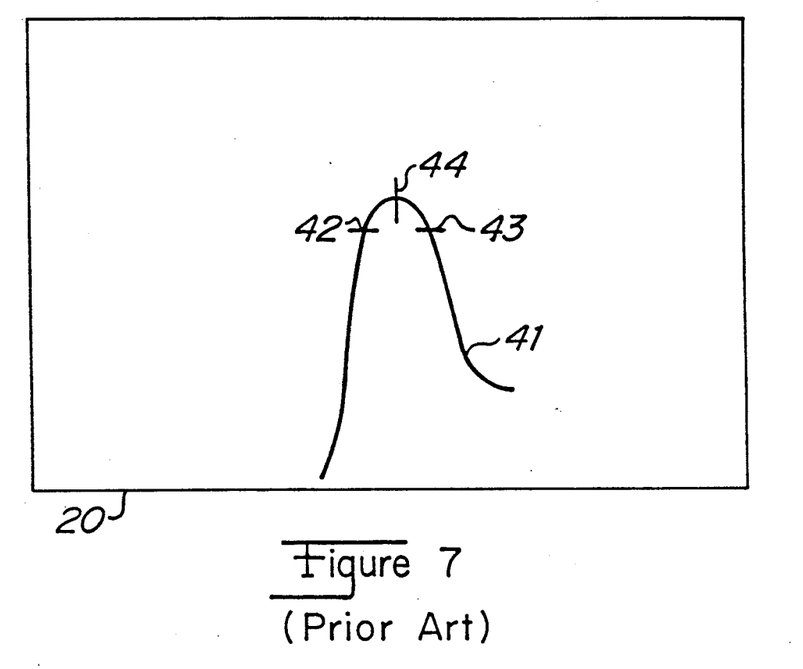
Figure 8:
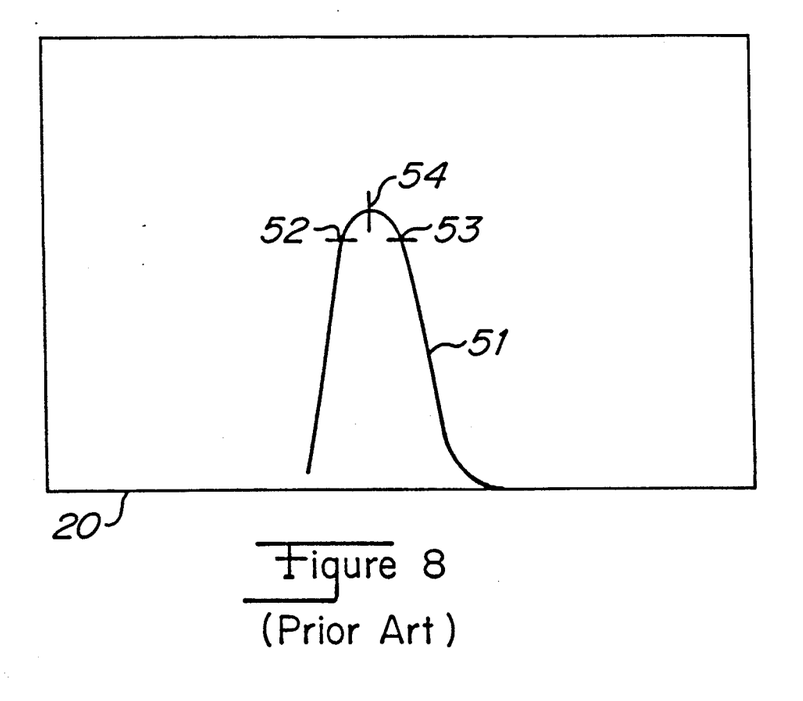

Step 10: From the data array, computer 1 calculates a point 52 where response is 90% of the maximum response from the left side of curve 51 and a point 53 where response is 90% of the maximum response from the right side of curve 51. A midpoint 54 between the 90% response points is chosen as the optimum Y-coordinate point. Computer 1 will instruct alignment and sealing station 3 to go to this coordinate point (X-optimum,Y-optimum,Z-optimum).

The present invention utilizes a response surface methodology to align optical fiber 10 to chip 11 in the X-Y plane. In the preferred embodiment of the present invention this is done using a two squared factorial as an alignment algorithm for calculating optimum position along the X-coordinate and the Y-coordinate axis. The response surface methodology is not used to align optical fiber to chip 11 along the Z-coordinate axis.

For the determination of peak response in the X-Y plane, there are essentially two basic steps. (1) Measurements are made from which the path of steepest ascent is determined by first order design model approximation. (2) Further measurements are made within a more limited region determined by the first order design model approximation. From the further measurements second order modelling is done to approximate the alignment resulting in a maximum response.

The method according to the present invention may be done varying alignment along three coordinate axes using a two cubed factorial or varying alignment along two coordinate axes using a two squared factorial.

In the preferred embodiment, a two squared factorial as an alignment algorithm for calculating optimum position along the X-coordinate and the Y-coordinate axis was chosen rather than a two cubed factorial along all three coordinate axes. This is because in the overall system in which the method was applied, the use of a two cubed factorial requiring alignment to be varied along the full Z-coordinate axis might result in lens 9 might be pushed through window 8. Trying to avoid this would result in arbitrarily limiting range of movement along the Z-coordinate axis, which could limit data from which the first order and second order approximations are made. This could result in the optimal response output not being found. Varying the focal point of lens 9 could solve this trouble. Applicant instead elected to avoid this problem by using the response surface methodology to find optimum position along the X-coordinate axis and the Y-coordinate only, not along the Z-coordinate axis.

Figure 9:
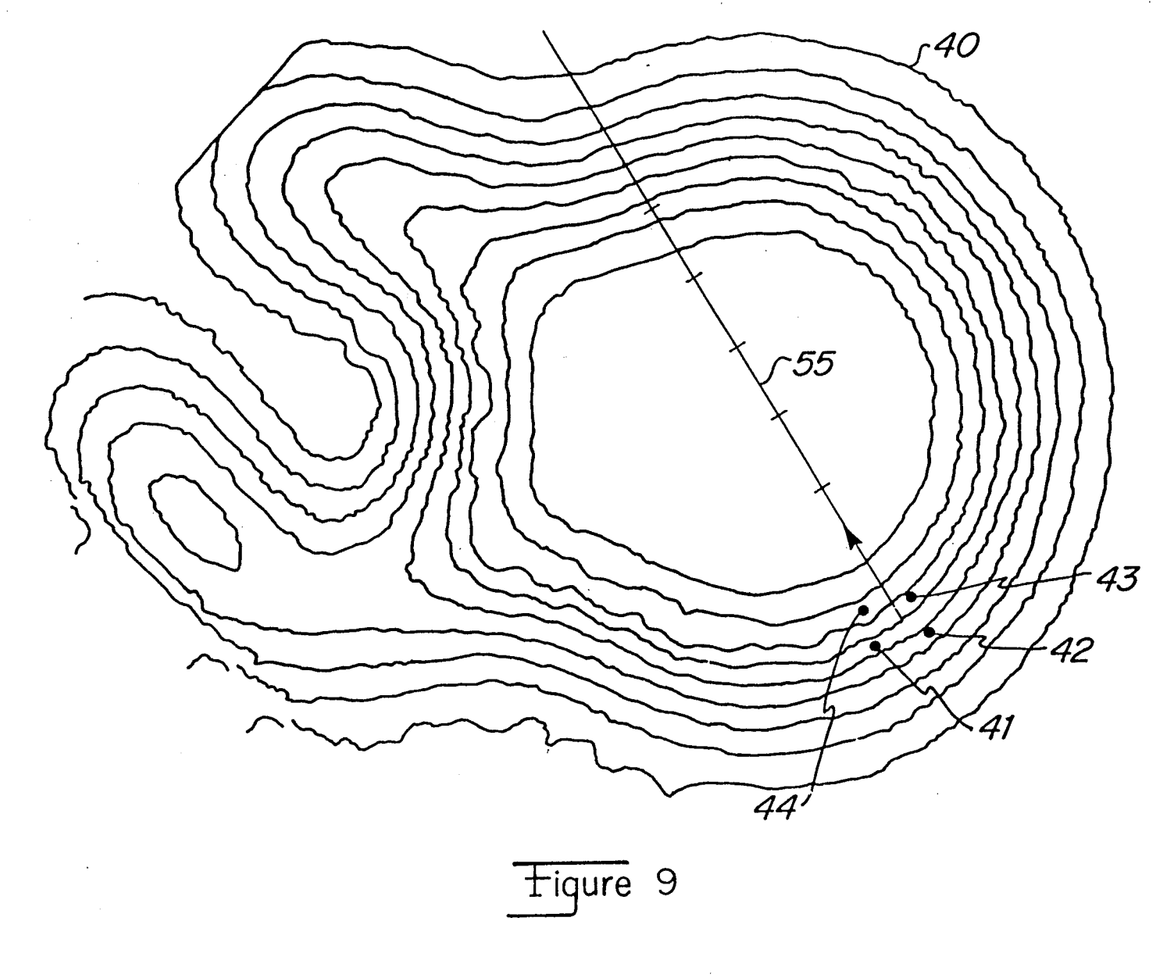
In FIG. 9, alignment points at which response is measured in a first order design model approximation are shown on a graph representing the responsiveness of a pin diode in detecting light signals in accordance with the preferred embodiment of the present invention.

A step-by-step procedure for performing the response surface methodology is set out below:

Step 1a: The initial X, Y and Z coordinates at the beginning of the alignment are defined as being at the coordinate position of (0,0,0). The response will be measured at four coordinate points: (−20,−20,0); (+20,−20,0); (−20,+20,0); (+20,+20,0) (Values for the coordinate points are give in micrometers). The four coordinate points are shown in FIG. 9 as points 41, 42, 43 and 44. FIG. 9 is a graph whose elevation lines indicate the response current generated by pin diode 101 as a function of the X-Y coordinate position of circular header 11. In order for ease of calculation, the coordinate points each have a coded form. Respectively the coded form of the co-ordinate points are (−1,−1,0); (+1,−1,0); (−1,+1,0); and (+1,+1,0). A matrix "A" derived from the coordinate points is as follows:

Matrix A

| Matrix A | | |
|---|---|---|
| 1.0 | −1.0 | −1.0 |
| 1.0 | 1.0 | −1.0 |
| 1.0 | −1.0 | 1.0 |
| 1.0 | 1.0 | 1.0 |

A′ is defined as the transpose of Matrix A and is as follows:

Matrix A′

| Matrix A′ | | | |
|---|---|---|---|
| 1.0 | 1.0 | 1.0 | 1.0 |
| −1.0 | 1.0 | −1.0 | 1.0 |
| −1.0 | −1.0 | 1.0 | 1.0 |

Step 1b: The response at the four coordinate points is measured and stored in a matrix P. Table 1 below gives example values for a measured response:

TABLE 1

| X-axis | X1 | Y-Axis | Y1 | Response (P) |
|---|---|---|---|---|
| −20 | −1 | −20 | −1 | +4.611 |
| +20 | +1 | −20 | −1 | +5.390 |
| −20 | −1 | +20 | +1 | +3.770 |
| +20 | +1 | +20 | +1 | +4.825 |

Matrix P is as follows:

Matrix P

+4.611
+5.390
+3.770
+4.825

Computer 1 uses the measured response to compute a response surface of a first order polynomial given to Equation 1 below:

$$Po = b0 = b1X1 = b2Y1 \qquad (1)$$

Po is the predicted response at a particular alignment along the X coordinate axis and the Y coordinate axis. In order to determine coefficients b0, b1 and b2, computer 1 employs at least squares method using matrix equation 2 below:

$$b = [(A'A)^{-1}]A'P \qquad (2)$$

For the example of measured responses given in Table 1, values of coefficients b0, b1 and b2 are calculated to be as follows. b0 equals +4.611. b1 equals +0.496. b2 equals −0.314.

Step 1c: The above calculations based on the response at the four measured coordinate points 41, 42, 43, 44, give the a path of steepest ascent of response 55 shown in FIG. 9. Path 55 is determined by equation 3 below:

$$Y1 = (b2/b1)X1 \qquad (3)$$

In order to confirm estimated values of Po (Po-est) along the path of steepest ascent as calculated using Equation 1, actual values of Po (Po-act) are measured. These actual values are measured starting at coordinate position (0,0,0). The resultant Table 2 below show values of Po-est calculated from equation 1 as well as typical values of P-act measured during an actual alignment.

TABLE 2

| X-axis | X1 | Y-axis | Y1 | Po-est | Po-act |
|---|---|---|---|---|---|
| 0 | 0 | 0 | 0 | 4.61 | 5.17 |
| +5 | +0.25 | −3.16 | −0.158 | 4.78 | 5.38 |
| +10 | +0.50 | −6.32 | −0.316 | 4.96 | 5.50 |
| +15 | +0.75 | −9.48 | −0.474 | 5.13 | 5.57 |
| +20 | +1.00 | −12.64 | −0.632 | 5.31 | 5.55 |
| +25 | +1.25 | −15.81 | −0.790 | 5.48 | 5.47 |
| +30 | +1.50 | −18.97 | −0.948 | 5.65 | 5.34 |
| +35 | +1.75 | −22.13 | −1.106 | 5.83 | 5.13 |
| +40 | +2.00 | −25.29 | −1.264 | 6.00 | 4.87 |
| +45 | +2.25 | −28.45 | −1.423 | 6.17 | 4.58 |
| +50 | +2.50 | −31.61 | −1.581 | 6.35 | 4.22 |
| +55 | +2.75 | −34.77 | −1.739 | 6.52 | 3.86 |
| +60 | +3.00 | −37.93 | −1.897 | 6.70 | 3.48 |
| +65 | +3.25 | −41.10 | −2.055 | 6.87 | 3.10 |
| +70 | +3.50 | −44.26 | −2.213 | 7.04 | 2.88 |
| +75 | +3.75 | −47.42 | −2.371 | 7.22 | 2.70 |

Figure 10:
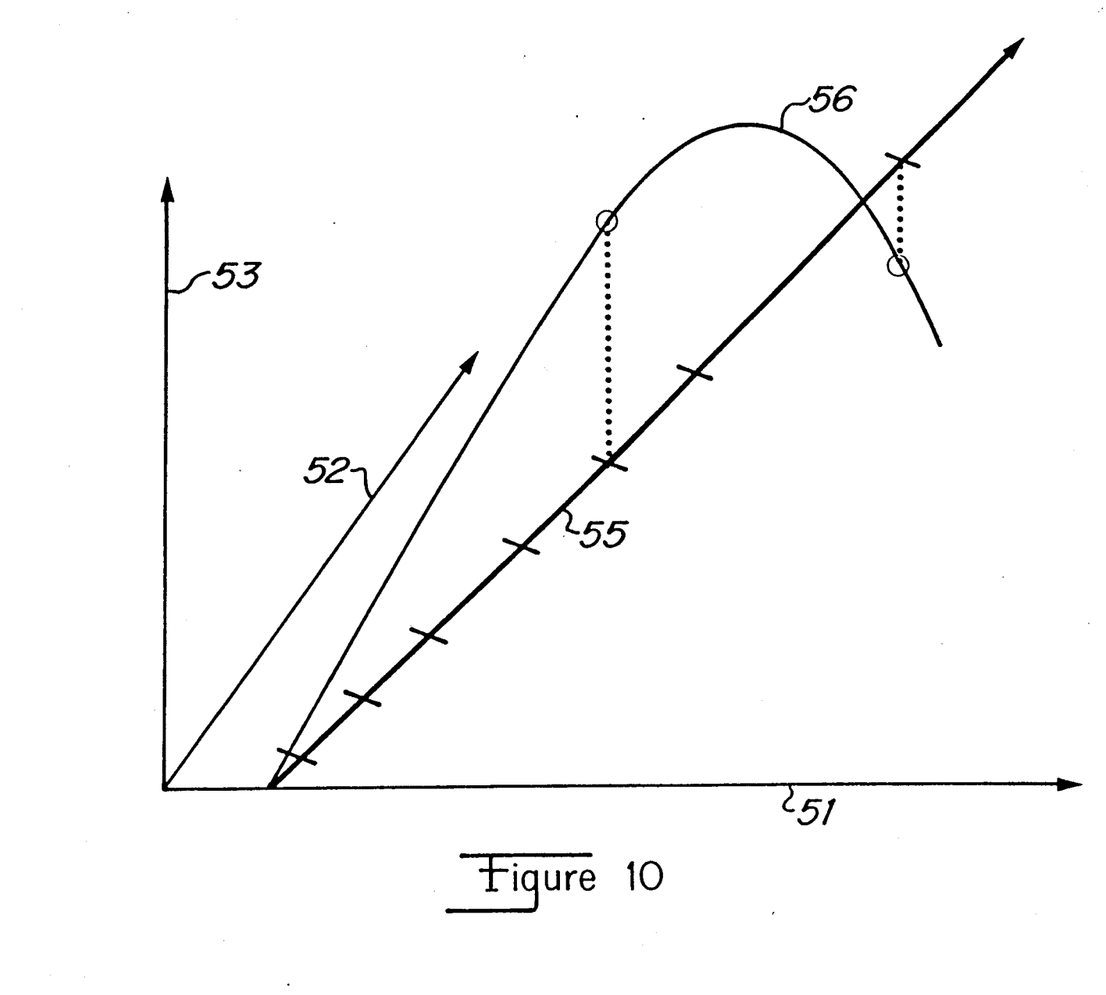
FIG. 10 is a graph which shows estimated response and measured response of a pin diode variously aligned in the X-Y plane in accordance with the preferred embodiment of the present invention.

A graph of predicted and actual response is shown in FIG. 10. Response axis 53 shows amount of response as position is moved along an X-axis 51 and an X-axis 52. Estimated path of steepest ascent response 55 (Po-est) may be contrasted with path of actual response 56 (Po-act).

Step 1d: Alignment and sealing station 3 is placed at the measured coordinate location with the greatest actual response (Po-act). From Table 2 it is seen that this is where X-axis equals +15 micrometers and Y-axis equals −9.48 micrometers. The chosen coordinate point (15, −9.48, 0) is now re-labelled (0,0,0) in preparation for step 2.

Step 2a: Having found the high yield response region, measurements are made in order to facilitate use of a second order composite approximation of the alignment which yields the highest response. For a designate of the three squared factorial design nine test condition runs are required. Example values for the alignment of the X-axis and the Y-axis coordinates, the coded form of each alignment and the measured response at each of the nine alignments are shown in Table 3 below:

TABLE 3

| X-axis | X1 | Y-axis | Y1 | Response (P) |
|---|---|---|---|---|
| −5 | −1 | −5 | −1 | 5.500 |
| +5 | +1 | −5 | −1 | 5.530 |
| −5 | −1 | +5 | +1 | 5.500 |
| +5 | +1 | +5 | +1 | 5.555 |
| −7.07 | −1.414 | 0 | 0 | 5.500 |
| +7.07 | +1.414 | 0 | 0 | 5.555 |
| 0 | 0 | −7.07 | −1.414 | 5.515 |
| 0 | 0 | +7.07 | +1.414 | 5.530 |
| 0 | 0 | 0 | 0 | 5.555 |

Figure 11:
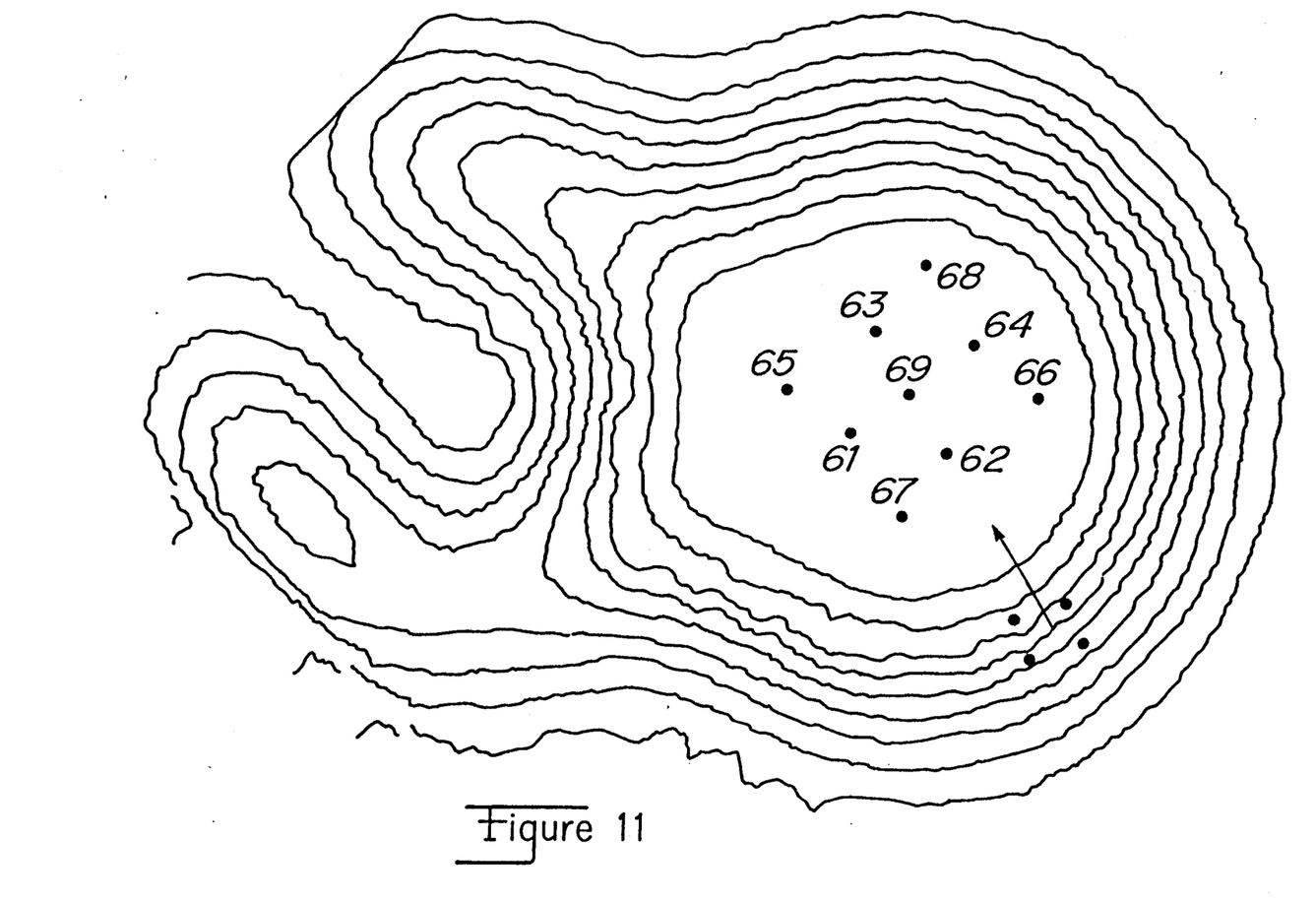
In FIG. 11, alignment points at which response is measured in a second order composite design model approximation are shown on the graph shown in FIG. 9 in accordance with the preferred embodiment of the present invention.

These measured points are shown in FIG. 11 as points 61, 16, 63, 64, 65, 66, 67, 68 and 69.

Step 2b: Computer 1 computes the response surface of the second order polynomial given by equation 4 below:

$$Po = b0 = b1X1 = b2Y1 = b11(X1^2) = b22(Y1^2) = b12(X1Y1) \qquad (4)$$

Coefficients b0, b1, b11, b22, and b12 are calculated by the least squares method using matrix equation (2) above. In equation (2), matrix A is as follows:

Matrix A

| Matrix A | | | | | |
|---|---|---|---|---|---|
| 1.0 | −1.0 | −1.0 | 1.0 | 1.0 | 1.0 |
| 1.0 | 1.0 | −1.0 | 1.0 | 1.0 | −1.0 |
| 1.0 | −1.0 | 1.0 | 1.0 | 1.0 | −1.0 |
| 1.0 | 1.0 | 1.0 | 1.0 | 1.0 | 1.0 |
| 1.0 | −1.414 | 0.0 | 2.0 | 0.0 | 0.0 |
| 1.0 | 1.414 | 0.0 | 2.0 | 0.0 | 0.0 |
| 1.0 | 0.0 | −1.414 | 0.0 | 2.0 | 0.0 |
| 1.0 | 0.0 | 1.414 | 0.0 | 2.0 | 0.0 |
| 1.0 | 0.0 | 0.0 | 0.0 | 0.0 | 0.0 |

Matrix A' is the transpose of Matrix A. Using the values in table 3 above, calculated values for the coefficients are as follows: b0 equals +5.555; b1 equals +1.020; b2 equals +0.006; b11 equals −0.015; b22 equals −0.017; and, b12 equals +0.006.

Step 2c: Computer 1 determines from equation (4) the coordinate values at which a maximum or minimum response occurs. This is done using equation (5) and equation (6) which respectively are the derivative of Po with respect to X1 and the derivative of Po with respect to Y1:

$$d(Po)/d/(X1) = b1 = 2*b11(X1) = b12(Y1) \qquad (5)$$

$$d(Po)/d/(Y1) = b2 = 2*b22(Y2) = b12(X1) \qquad (6)$$

The derivative in equation (5) is set to zero and the derivative in equation (6) is set to zero. The simultaneous equations are then solved to find the values X1 and Y1 for maximum or minimum Po.

Step 2d: Computer 1 substitutes the values for X1 and Y1 found in Step 2c into equation (4) to determine the estimated response (Po-est). Computer 1 performs six confirmatory tests by measuring actual responses (Po-act) at positions in the X-Y plane. Po-est versus Po-act are given in table 4 below:

TABLE 4

| X-axis | X1 | Y-axis | Y1 | Po-est | Po-act |
|---|---|---|---|---|---|
| 0 | 0 | 0 | 0 | 5.55 | 5.56 |
| +0.76 | +0.152 | +0.31 | +0.061 | 5.56 | 5.57 |
| +1.52 | +0.303 | +0.61 | +0.122 | 5.56 | 5.57 |
| +2.27 | +0.455 | +0.92 | +0.184 | 5.56 | 5.57 |
| +3.03 | +0.606 | +1.22 | +0.245 | 5.56 | 5.58 |
| +3.79 | +0.758 | +1.53 | +0.306 | 5.56 | 5.58 |

The alignment that yields the peak response is selected. In this case it would be coordinate (3.03, 1.22,0) which is also (X-peak,Y-peak,0). Computer 1 resets this coordinate to be coordinate (0,0,0).

Step 3: Computer 1 varies the motor's Z-coordinate position until the optimum Z-coordinate position (i.e., the Z-coordinate position which results in the highest response) is found.

Step 4a: Upon finding Z-optimum, measurements for a second order approximation are again obtained. The response at nine alignments are obtained. Example values for the alignment of the X-axis and the Y-axis coordinates, the coded form of each alignment and the measured response at each of the nine alignments are shown in Table 5 below:

TABLE 5

| X-axis | X1 | Y-axis | Y1 | Response |
|---|---|---|---|---|
| −3 | −1 | −3 | −1 | 9.075 |
| 0 | 0 | −3 | −1 | 9.065 |
| +3 | +1 | −3 | −1 | 9.060 |
| −3 | −1 | 0 | 0 | 9.070 |
| 0 | 0 | 0 | 0 | 9.070 |
| +3 | +1 | 0 | 0 | 9.050 |
| −3 | −1 | +3 | +1 | 9.070 |
| 0 | 0 | +3 | +1 | 9.060 |
| +3 | +3 | +3 | +1 | 9.035 |

Step 4b: Computer 1 then computes the response surface of the second order polynomial given by equation (4). Coefficients b0, b1, b11, b22, and b12 are calculated by the least squares method using matrix equation (2) above. Matrix A is as follows:

Matrix A

| | | Matrix A | | | |
|---|---|---|---|---|---|
| 1.0 | −1.0 | −1.0 | 1.0 | 1.0 | 1.0 |
| 1.0 | 0.0 | −1.0 | 0.0 | 1.0 | 0.0 |
| 1.0 | 1.0 | −1.0 | 1.0 | 1.0 | −1.0 |
| 1.0 | −1.0 | 0.0 | 1.0 | 0.0 | 0.0 |
| 1.0 | 0.0 | 0.0 | 0.0 | 0.0 | 0.0 |
| 1.0 | 1.0 | 0.0 | 1.0 | 0.0 | 0.0 |
| 1.0 | −1.0 | 1.0 | 1.0 | 1.0 | −1.0 |
| 1.0 | 0.0 | 1.0 | 0.0 | 1.0 | 0.0 |
| 1.0 | 1.0 | 1.0 | 1.0 | 1.0 | 1.0 |

Using the values in table 5 above, calculated values for the coefficients are as follows: b0 equals 9.067; b1 equals −0.012; b2 equals −0.006; b11 equals −0.005; b22 equals −0.002; and b12 equals −0.005.

Step 4c: Computer 1 determines from equation (4) the coordinate values at which a maximum or minimum response occurs. This is again done using equation (5) and (6). The derivative in equation (5) is set to zero and the derivative in equation (6) is set to zero. The simultaneous equations are solved in order to find the values X1 and Y1 for maximum or minimum Po.

Step 4d: Computer 1 substitutes the values for X1 and Y1 found in Step 4c into equation 4 to determine the estimated response (Po-est). Computer 1 performs six confirmatory tests by measuring actual responses (Po-act) at positions in the X-Y plane. Po-est versus Po-act are given in table 6 below:

TABLE 6

| X-axis | X1 | Y-axis | Y1 | Po-est | Po-act |
|---|---|---|---|---|---|
| 0 | 0 | +2.1E-12 | 0 | 9.07 | 9.06 |
| −1.17 | +0.152 | −4.3E-12 | 0 | 9.07 | 9.06 |
| −2.3 | +0.303 | −6.5E-12 | 0 | 9.07 | 9.07 |
| −3.5 | +0.455 | −6.7E-12 | 0 | 9.07 | 9.06 |
| −4.67 | +0.606 | −8.7E-12 | 0 | 9.07 | 9.07 |
| −5.83 | +0.758 | −1.1E-11 | 0 | 9.07 | 9.07 |

The alignment that yields the peak response is selected. In this case it would be coordinate (−2.33, 0,Z-optimum) which is also (X-optimum,Y-optimum, Z-optimum).

The method of the present invention compares favorably with the one-variable-at a time method. In a typical one-variable-at-a time method, for alignment in the x-y coordinate plane 80 coordinate points are measured in the crude alignment (before the Z direction alignment) and another 80 coordinate points are measured in the final alignment (after the Z direction alignment). Using the method of the present invention, however, crude alignment in the X-Y plane was done measuring the response at only 35 coordinate points. The final alignment in the X-Y plane was performed measuring only 15 coordinate points.

For a two cubed factorial, the surface response method can be used with only a few changes. There are essentially still two basic steps: (1) Measurements are made from which the path of steepest ascent is determined by first order design model approximation. (2) Further measurements are made within a more limited region determined by the first order design model approximation. From the further measurements second order modelling is done to approximate the alignment resulting in a maximum response.

The first order equation (1) is changed to equation (7) below:

$$Po = b0 = b1X1 = b2Y1 = b3Z1 \qquad (7)$$

The second order equation 1 is changed to equation (8)

$$Po = b0 = b1X1 = b2Y1 = b3Z3 = b12(X-1Y1) = b13(X1Z1) = b23(Y1Z1) = b123X1Y1Z1 \qquad (8)$$

The coded settings of each alignment for the second order composite design are as in table 7 below:

TABLE 7

| X1 | Y1 | Z1 |
|---|---|---|
| −1 | −1 | −1 |
| 1 | −1 | −1 |
| −1 | 1 | −1 |
| 1 | 1 | −1 |
| −1 | −1 | 1 |
| 1 | −1 | 1 |
| −1 | 1 | 1 |
| 1 | 1 | 1 |
| −1.682 | 0 | 0 |

TABLE 7-continued

| X1 | Y1 | Z1 |
|---|---|---|
| 1.682 | 0 | 0 |
| 0 | −1.682 | 0 |
| 0 | 1.682 | 0 |
| 0 | 0 | −1.682 |
| 0 | 0 | 1.682 |
| 0 | 0 | 0 |

Matrix A for the second order composite equation is given below:

Matrix A

| | | | | | | | |
|---|---|---|---|---|---|---|---|
| 1 | −1 | −1 | −1 | 1 | 1 | 1 | −1 |
| 1 | 1 | −1 | −1 | −1 | −1 | 1 | 1 |
| 1 | −1 | 1 | −1 | −1 | 1 | −1 | 1 |
| 1 | 1 | 1 | −1 | 1 | −1 | −1 | −1 |
| 1 | −1 | −1 | 1 | 1 | −1 | −1 | 1 |
| 1 | 1 | −1 | 1 | −1 | 1 | −1 | −1 |
| 1 | −1 | 1 | 1 | −1 | −1 | 1 | −1 |
| 1 | 1 | 1 | 1 | 1 | 1 | 1 | 1 |
| 1 | −1.682 | 0 | 0 | 0 | 0 | 0 | 0 |
| 1 | 1.682 | 0 | 0 | 0 | 0 | 0 | 0 |
| 1 | 0 | −1.682 | 0 | 0 | 0 | 0 | 0 |
| 1 | 0 | 1.682 | 0 | 0 | 0 | 0 | 0 |
| 1 | 0 | 0 | −1.682 | 0 | 0 | 0 | 0 |
| 1 | 0 | 0 | 1.682 | 0 | 0 | 0 | 0 |
| 1 | 0 | 0 | 0 | 0 | 0 | 0 | 0 |

General statistical information related to the present invention may be found in Box, Hunter & Hunter. *Statistics for Experimenters*. Chapters 14 and 15.

I claim:

1. A method for locating an optimum alignment of an optical fiber to an active device in an X-Y coordinate plane perpendicular to the optical fiber, the optimum alignment being at X-Y coordinates where an optimal transfer of light between the active device and the optical fiber takes place, the method comprising the steps of:
   (a) aligning the optical fiber to the active device at a first series of X-Y coordinates and taking first measurements which indicate the relative amount of light transferred between the optical fiber and the active device at each of the first series of X-Y coordinates;
   (b) making a first order design model approximation of the path of steepest ascent of the amount of transferred light relative to selected X-Y coordinates, the first order design model approximation being based on the first measurements;
   (c) taking second measurements of the amount of transferred light when the optical fiber is aligned with the active device at a second series of X-Y coordinates along the approximation of the path of steepest ascent;
   (d) taking third measurements of the amount of transferred light when the optical fiber is aligned with the active device at a third series of X-Y coordinates, the third series of X-Y coordinates being in a region which includes the X-Y coordinate in the second series of X-Y coordinates at which the maximum amount of transferred light was measured;
   (e) making a second order composite design model approximation of the approximate optimal alignment X-Y coordinate at which the maximum amount of light is transferred, the second order composite design model approximation being based on the third measurements;
   (f) taking fourth measurements of the amount of transferred light when the optical fiber is aligned with the active device at a fourth series of X-Y coordinates near the approximate optimal alignment X-Y coordinate; and,
   (g) selecting as the optimum alignment of the optical fiber to the active device an X-Y coordinate from the fourth series of X-Y coordinates at which the maximum amount of transferred light was measured.

2. A method as in claim 1 wherein the first order design model approximation of the steepest past ascent is calculated using the following equation:

$$Po = b0 = b1X1 = b2Y1;$$

where Po is proportional to the amount of transferred light, X1 is proportional to the X coordinate, Y1 is proportional to the Y coordinate and b0, b1 and b2 are coefficients.

3. A method as in claim 1 wherein the second order composite design model approximation of the steepest past ascent is calculated using the following equation:

$$Po = b0 = b1X1 = b2Y1 = b11(X1^2) = b22(Y1^2) = b12(X1Y1)$$

where Po is proportional to the amount of transferred light, X1 is proportional to the X coordinate, Y1 is proportional to the Y coordinate and b0, b1, b2, b11, b22 and b12 are coefficients.

4. A method for locating an optimum alignment of an optical fiber to an active device, the optimum alignment being at X-Y-Z coordinates where an optimal transfer of light between the active device and the optical fiber takes place, the method comprising the steps of:
   (a) aligning the optical fiber to the active device at a first series of X-Y coordinates in an X-Y coordinate plane perpendicular to the optical fiber and taking first measurements which indicate the relative amount of light transferred between the optical fiber and the active device at each of the first series of X-Y coordinates;
   (b) making a first order design model approximation of the path of steepest ascent of the amount of transferred light relative to selected X-Y coordinates, the first order design model approximation being based on the first measurements;
   (c) taking second measurements of the amount of transferred light when the optical fiber is aligned with the active device at a second series of X-Y coordinates along the approximation of the path of steepest ascent;
   (d) taking third measurements of the amount of transferred light when the optical fiber is aligned with the active device at a third series of X-Y coordinates, the third series of X-Y coordinates being in a region which includes the X-Y coordinate in the second series of X-Y coordinates at which the maximum amount of transferred light was measured;
   (e) making a second order design model approximation of the approximate peak alignment X-Y coordinate at which the maximum amount of light is transferred, the second order design model approximation being based on the third measurements;

(f) taking fourth measurements of the amount of transferred light when the optical fiber is aligned with the active device at a fourth series of X-Y coordinates near the approximate peak alignment X-Y coordinate;

(g) selecting as a peak X-Y coordinate alignment of the optical fiber to the active device an X-Y coordinate from the fourth series of X-Y coordinates at which the maximum amount of transferred light was measured;

(h) taking fifth measurements of the amount of transferred light when the optical filter is aligned at a fifth series of coordinate points in which the Z coordinate is varied and X-Y coordinates are at the peak X-Y coordinate alignment;

(i) selecting as the optimum Z coordinate the Z coordinate in the fifth series of coordinate points at which the maximum amount of transferred light was measured;

(j) taking sixth measurements of the amount of transferred light when the optical fiber is aligned with the active device at a sixth series of coordinates, the sixth series of coordinates being in plane of the optimum Z coordinate and in a region which includes the X-Y peak coordinate;

(k) making a second order design model approximation of the approximate optimal alignment X-Y coordinate at which the maximum amount of light is transferred, the second order design model approximation being based on the sixth measurements;

(l) taking seventh measurements of the amount of transferred light when the optical fiber is aligned with the active device at a seventh series of coordinates near the approximate optimal alignment X-Y coordinate; and, (g) selecting as a optimal coordinate alignment of the optical fiber to the active device an X-Y-Z coordinate from the seventh series of coordinates at which the maximum amount of transferred light was measured.

5. A method as in claim 4 wherein the first order design model approximation of the steepest past ascent is calculated using the following equation:

$$Po = b0 = b1X1 = b2Y1$$

where Po is proportional to the amount of transferred light, X1 is proportional to the X coordinate, Y1 is proportional to the Y coordinate and b0, b1 and b2 are coefficients.

6. A method as in claim 4 wherein the second order design model approximation of the steepest past ascent is calculated using the following equation:

$$Po = b0 = b1(X1) = b2(Y1) = b11(X1^2) = b22(Y1^2) = b12(X1Y1);$$

where Po is proportional to the amount of transferred light, X1 is proportional to the X coordinate, Y1 is proportional to the Y coordinate and b0, b1, b2, b11, b22 and b12 are coefficients.

7. A method for locating an optimum alignment of an optical fiber to an active device, the optimum alignment being at X-Y-Z coordinates where an optimal transfer of light between the active device and the optical fiber takes place, the method comprising the steps of:

(a) aligning the optical fiber to the active device at a first series of X-Y-Z coordinates and taking first measurements which indicate the relative amount of light transferred between the optical fiber and the active device at each of the first series of X-Y-Z coordinates;

(b) making a first order design model approximation of the path of steepest ascent of the amount of transferred light relative to selected X-Y-Z coordinates, the first order design model approximation being based on the first measurements;

(c) taking second measurements of the amount of transferred light when the optical fiber is aligned with the active device at a second series of X-Y-Z coordinates along the approximation of the path of steepest ascent;

(d) taking third measurements of the amount of transferred light when the optical fiber is aligned with the active device at a third series of X-Y-Z coordinates, the third series of X-Y-Z coordinates being in a region which includes the X-Y-Z coordinate in the second series of X-Y-Z coordinates at which the maximum amount of transferred light was measured;

(e) making a second order composite design model approximation of the approximate optimal alignment X-Y-Z coordinate at which the maximum amount of light is transferred, the second order composite design model approximation being based on the third measurements;

(f) taking fourth measurements of the amount of transferred light when the optical fiber is aligned with the active device at a fourth series of X-Y-Z coordinates near the approximate optimal alignment X-Y-Z coordinate; and, (g) selecting as the optimum alignment of the optical fiber to the active device an X-Y-Z coordinate from the fourth series of X-Y-Z coordinates at which the maximum amount of transferred light was measured.

8. A method as in claim 7 wherein the first order design model approximation of the steepest past ascent is calculated using the following equation:

$$Po = b0 = b1X1 = b2Y1 = b3Z1;$$

where po is proportional to the amount of transferred light, X1 is proportional to the X coordinate, Y1 is proportional to the Y coordinate, Z1 is proportional to the Z coordinate and b0, b1, b2 and b3 are coefficients.

9. A method as in claim 7 wherein the second order composite design model approximation of the steepest past ascent is calculated using the following equation:

$$Po = b0 = b1X1 = b2Y1 = b3Z3 = b12(X1Y1) = b13(X1Z1) = b23(Y1Z1) = b123X1Y1Z1;$$

where Po is proportional to the amount of transferred light, X1 is proportional to the X coordinate, Y1 is proportional, to the Y coordinate, Z1 is proportional to the Z coordinate and b0, b1, b2, b3, b12, b13, b23 and b123 are coefficients.

* * * * *